United States Patent [19]

Marino et al.

[11] Patent Number: 4,542,872
[45] Date of Patent: Sep. 24, 1985

[54] TERMINAL WITH TILT-SWIVEL DISPLAY

[75] Inventors: Jerry C. Marino, Sudbury; David E. Desilets, Hopkinton, both of Mass.

[73] Assignee: Prime Computer, Inc., Natick, Mass.

[21] Appl. No.: 465,273

[22] Filed: Feb. 9, 1983

[51] Int. Cl.[4] .............................. F16M 11/12
[52] U.S. Cl. ................... 248/183; 248/349; 248/371
[58] Field of Search .............. 248/349, 183, 181, 371, 248/663, 179, 649; 179/2 TV

[56] References Cited

U.S. PATENT DOCUMENTS

| | | |
|---|---|---|
| 986,451 | 3/1911 | Franks . |
| 1,166,752 | 1/1916 | Finizio . |
| 1,358,159 | 11/1920 | Kern . |
| 1,956,614 | 5/1934 | Engelhardt ........................ 248/15 |
| 2,452,316 | 10/1948 | Morley ........................ 248/181 X |
| 2,499,579 | 3/1950 | Fritsch ........................... 178/7.5 |
| 2,805,411 | 9/1957 | Rose ............................ 340/367 |
| 3,241,393 | 3/1966 | Norcross ........................ 74/501 |
| 3,536,832 | 10/1970 | Zipse ........................... 178/7.81 |
| 3,789,140 | 1/1974 | McQueen et al. ................ 178/7.81 |
| 3,813,491 | 5/1974 | Pennar ......................... 178/7.81 |
| 3,970,792 | 7/1976 | Benham et al. ................... 179/2 |
| 4,068,961 | 1/1978 | Ebner et al. ..................... 403/55 |
| 4,354,654 | 10/1982 | Werner ....................... 248/349 X |
| 4,365,779 | 12/1982 | Bates et al. ..................... 248/371 |
| 4,378,943 | 4/1983 | Newberry ..................... 248/349 X |
| 4,395,010 | 7/1983 | Helgeland .................... 248/183 X |
| 4,410,159 | 10/1983 | McVicker et al. ............... 248/349 |
| 4,415,136 | 11/1983 | Knoll ........................... 248/181 |

FOREIGN PATENT DOCUMENTS 1077024  11/1954  France ............................ 248/179

*Primary Examiner*—J. Franklin Foss
*Attorney, Agent, or Firm*—Lahive & Cockfield

[57] ABSTRACT

A display terminal device including a tilt and swivel coupling mechanism coupling the display portion to the base portion. The coupling mechanism includes a swivel plate rotatable about a vertical neck extending from the base portion. The swivel plate includes a cylindrical top surface on which a complementary cylindrical surface of the display portion is seated. The cylindrical surfaces are spring biased toward each other by a spring mounted on a fastener extending from the display portion to the swivel plate. A horizontal fastener extends from the housing through horizontal slots in the neck.

6 Claims, 7 Drawing Figures

TERMINAL WITH TILT-SWIVEL DISPLAY

BACKGROUND OF THE INVENTION

This invention relates generally to display terminal devices and particularly display terminal devices including coupling mechanisms for permitting partial tilt and partial rotation of a display portion with respect to a base member.

It is desirable to mount the video display terminals associated with many types of office and computer systems so that the terminals can be easily adjusted for the viewer's comfort and for glare-free viewing. The display portion of the terminals are preferably movable through a range of positions by the viewer who sits before the terminal.

Such terminals typically incorporate a cathode ray tube (CRT) in the display portion and are fairly relatively heavy. Consequently the coupling mechanisms by which the display portions tilt and rotate must be constructed to give sturdy and secure support. Furthermore, the display portions should move easily through the range of positions, but not so easily that they are easily knocked away from their adjusted position. It is also usually desirable to be able to adjust the position of the display portion in one plane without fear of inadvertently changing its orientation in the other.

Various tilting, rotating and swivelling coupling mechanisms for mounting one piece of equipment on another that have been devised in the prior art are exemplified by U.S. Pat. Nos. 4,068,961, 1,166,752, and 1,956,614. The coupling mechanisms shown in these patents have many different features. However, none include satisfactory isolation of two independent degrees of rotational freedom. Moreover, none show satisfactory means for holding a position following adjustment. U.S. Pat. No. 3,970,792 discloses a terminal swivel tilt mechanism which permits independent degrees of rotational freedom, but requires two rockers (for tilt) which must be specifically located with respect to the display center of gravity to permit a tilt adjustment to be maintained.

It is an object of this invention to provide a new and improved tilting and rotating mechanism for coupling a display portion of a terminal to the base portion of the terminal in a way that provides secure and steady attachment and support, that allows the display portion to be adjustably and independently tilted or rotated. Another object is to provide an improved mechanism for maintaining an adjusted position of the display portion of a terminal.

SUMMARY OF THE INVENTION

The invention provides a terminal device having a display portion coupled to a base portion by a mechanism for permitting independent rotational movements about two perpendicular axes. The mechanism includes a vertically extending first element affixed to the base portion and a second element mounted on the first element and adapted for rotation about the first element and thereby defining a first axis of rotation. A third element is affixed to the display portion. The second and third elements include complementary cylindrical surfaces extending along a common horizontal axis. The second and third elements are positioned so that the cylindrical surfaces are in sliding contact and one is rotatable with respect to the other about the horizontal axis, defining a second axis of rotation perpendicular to the first axis. The mechanism includes biasing means including a spring for biasing the first and second cylindrical surfaces toward each other.

In preferred embodiments, the biasing means includes fastening means extending from the second cylindrical surface portion through slots in the first cylindrical surface portion, and a spring means mounted on the fastening means. Also, the first element is vertically extending, having a horizontal slot, and the second element includes a fastening member passing through said slot.

BRIEF DESCRIPTION OF THE DRAWINGS

Other objects, features and advantages will appear from the following description of a preferred embodiment of the invention, including the drawings thereof, in which.

DESCRIPTION OF A PREFERRED EMBODIMENT

Figure 1:
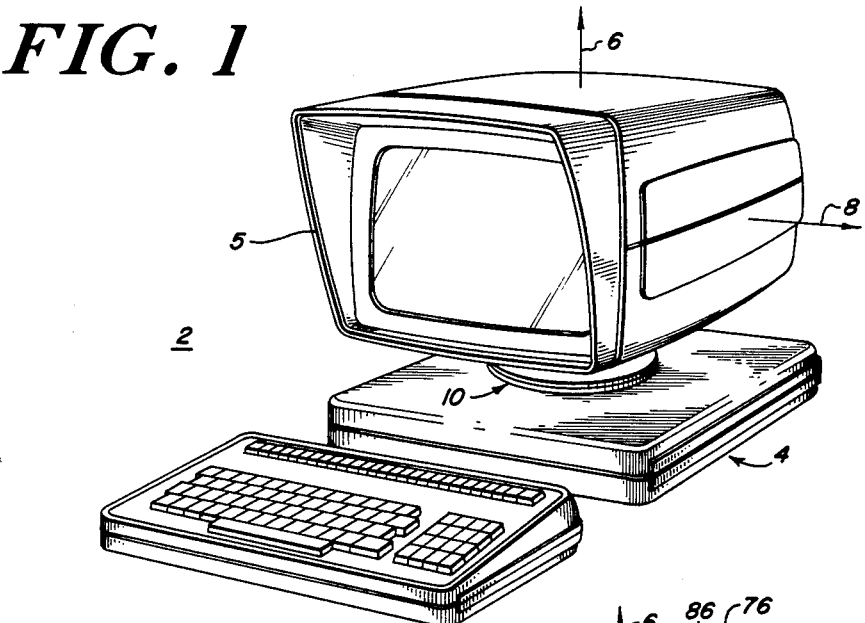
FIG. 1 is a perspective view of a terminal embodying the invention.
Figure 2:
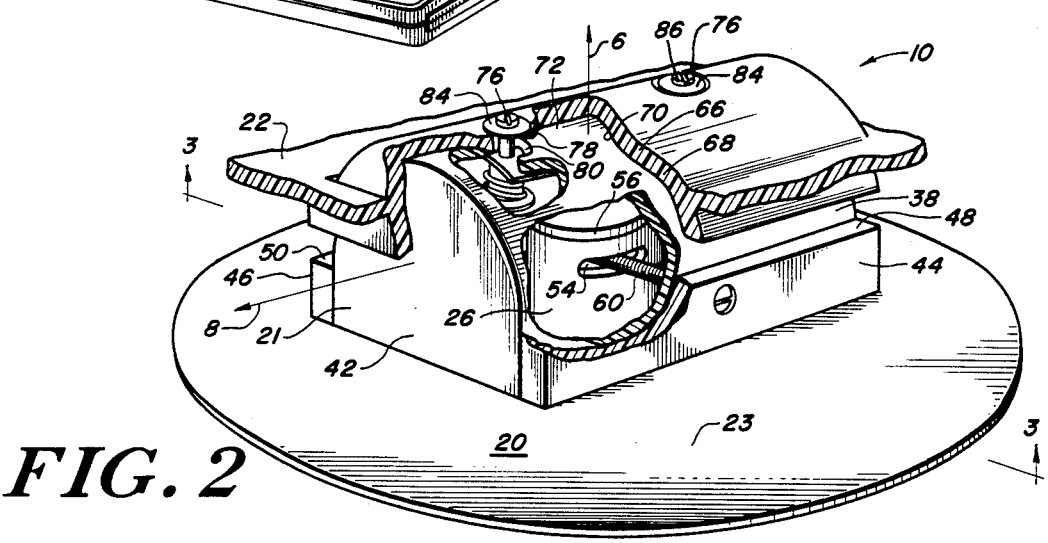
FIG. 2 is a perspective view, with some portions broken away, of the mechanism for coupling the display portion and has a portion of the terminal of FIG. 1.

FIG. 1 shows an exemplary terminal 2 embodying the present invention. The terminal 2 includes a base portion 4, a CRT display portion 5 and a coupling mechanism (denoted generally by reference designation 10). The coupling mechanism 10 supports the display portion 5 on the base portion 4 in a manner permitting a user to adjustably position the angular position of the display portion about a vertical reference axis 6 (i e. adjust the "swivel") and about a horizontal reference axis 8 (i.e. adjust the "tilt").

Figure 3:
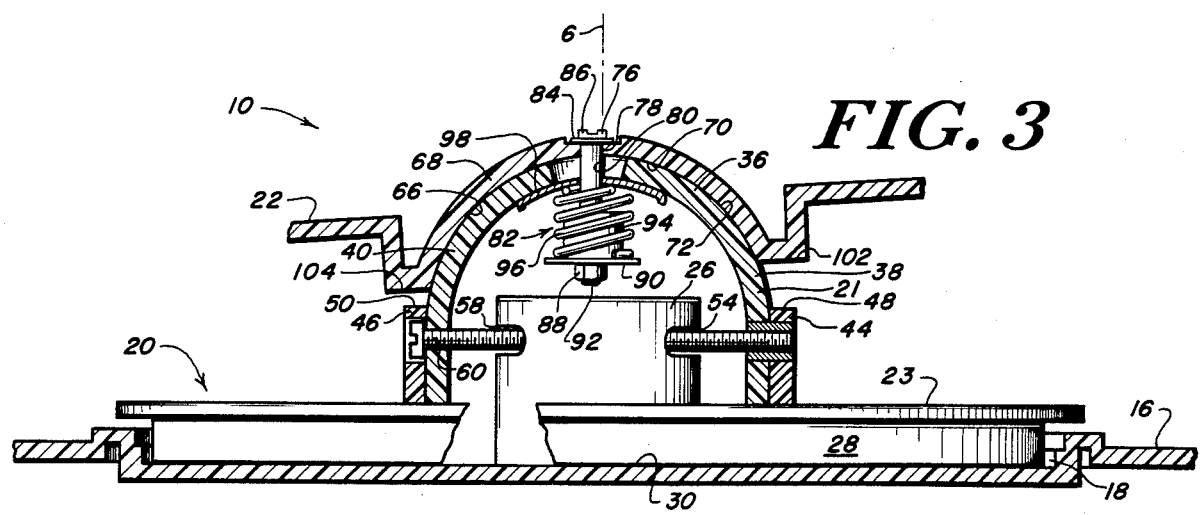
FIG. 3 shows the coupling mechanism of FIG. 2, partially in a side elevation view, and partially in section along lines 3—3, in position in the top cover of the base portion of the terminal.
Figure 6:
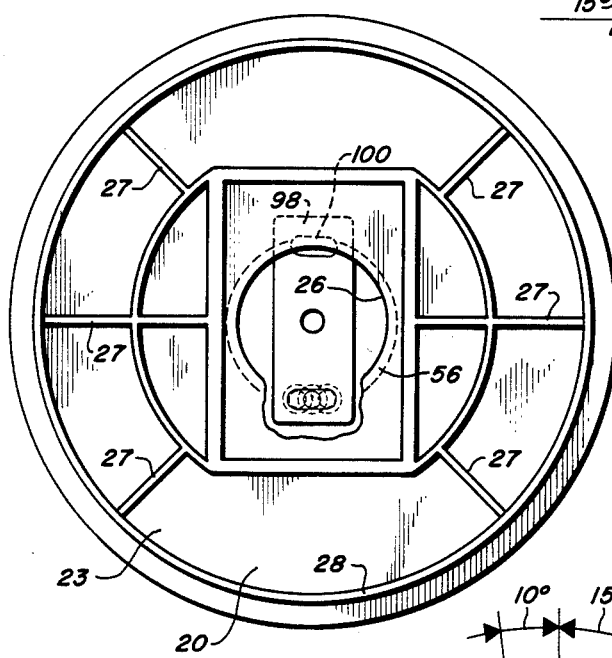
FIG. 6 is a plan view of the swivel plate and neck of the coupling mechanism of the terminal of FIG. 1.
Figure 7:
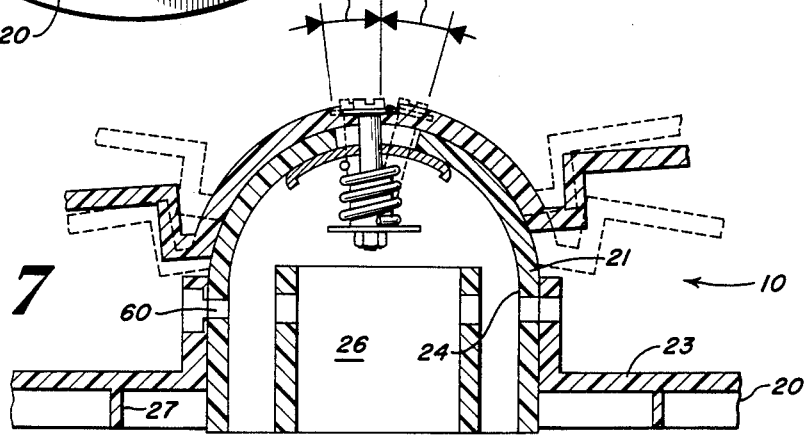
FIG. 7 is a view like FIG. 3 showing the range of tilt available for the coupling mechanism of the terminal of FIG. 1.

The coupling mechanism 10 generally includes a circular swivel plate 20, a semi-cylindrical member 21 and a bottom plate 62 (which is integral with the bottom of the enclosure for the CRT display portion 5). The top cover 16 of the base portion 4 includes circular recess 18 (see FIG. 3) with a central swivel neck 26 extending therefrom about axis 6. The recess 18 is adapted for receiving the swivel plate 20 of the coupling mechanism 10. The swivel plate 20 has a generally disc-like portion 23 with a central aperture 24 through which a swivel neck 26 passes. The swivel plate 20 further includes strengthening ribs 27 (see FIG. 6) formed below the disc portion 23 and a peripheral rim 28 that is rotatable in a peripheral channel on the planar floor 30 of the recess 18. In other embodiments, the rim 28 may take the form of a plurality of segments extending downward from the periphery of plate 20.

The swivel plate 20 includes the semi-cylindrical display support member 21 extending upwardly from the center 32 of the disc portion 23. The member 21 has a top wall 36 having a cylindrical outer surface; front and back, generally vertical, walls 38,40 merging with the cylindrical top wall 36, and end walls 42 to complete the member 21. Both front and back walls 38,40 include stepped, shorter vertical members 44,46 with upper horizontal surfaces 48,50, respectively.

The swivel neck 26 is cylindrical, with its central axis being substantially co-axial with the axis 6. As shown, the swivel neck 26 projects vertically through a central circular aperture 24 of the swivel plate 20 up and into the member 21 so that the swivel plate is rotatable about the axis 6. A horizontal slot 54 is located in the wall 56 of the swivel neck 26 facing the front wall 38 of the member 21. Another, corresponding slot 58, is located in the swivel neck 26 opposite the first slot 54.

A screw 60, seated in member 44 passes through wall 38, the slots 54,58 in the swivel neck 26, wall 40 and into the member 46 where it is captively held. The width of each slot 54,58 is just slightly larger than the outside diameter of the screw 60. Once the screw 60 is in place, tilting the swivel plate 20 in the recess 18 is negligible.

Figure 4:
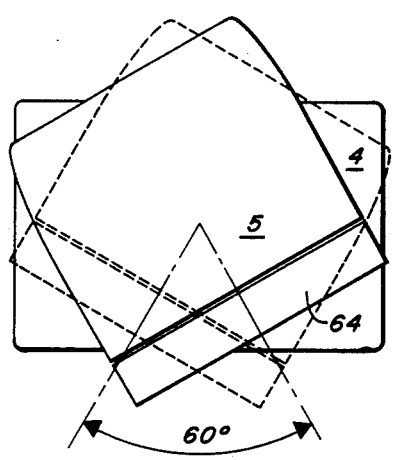
FIG. 4 is a top view of the range of swivel for the CRT of the terminal of FIG. 1.

With this arrangement, rotation of the swivel plate 20, to which the member 21 is fixed, is limited by the interfering of the screw 60 with the ends of slots 54 and 58. The extent of the limitation is set by the width of the slots 54,58. In the preferred form, as seen in FIG. 4, the limit is typically set so that the display portion 5 can move through an arc of about 60 degrees. In other words, the slots 54,58 in the swivel neck 26 encompass an angle of approximately 60 degrees.

The bottom portion 22 of the enclosure of the CRT display portion 5 in the illustrative embodiment includes a recess 66 with a wall 68 having a concave cylindrical inner surface 60 complementary to the convex cylindrical outer surface 72 of the top wall 36 of the member 21 on the swivel plate 20.

The display portion 5 is secured to the member 21 with the surfaces 70 and 72 held adjacent to each other so that the central axes of the cylindrical surfaces 70 and 72 are coaxial with axis 8. This positioning is accomplished by two shoulder screws 76 passing through associated holes 78 in the wall 68 and slots 80 in the top wall 36 of the member 21. Each shoulder screw 76 has a washer 84 just below the shoulder screw head 86 outside the wall 68. Each screw 76 has an assembly at its other end which includes a nut 88 and washer 90, and a spacer 94 and spring 96 surrounding the screw 76 in between the nut washer 90 and the housing top wall 36.

A single arcuate spring plate 98, with two slots 100 corresponding to the slots 80 in the housing top wall 36, is located just below the housing top wall 36, with the spring plate's slots 100 aligned with the top wall slots 80. The shoulder screws 76 pass through the spring plate slots 100 after passing through the top wall slots 80. The biasing springs 96 mounted on the spacers 94 bias the spring plate 98 against the housing top wall 36, and thus bias the top wall 36 against the wall 68. The force of the springs 96, and hence the frictional forces between the surfaces 70,72 of these two walls 36,68, may be adjusted by varying the angular position of the shoulder screws 76, up to the limit of the spacer 94. The specific spring tension provided by such adjustment is selected to accommodate to weight and distribution of weight in the display portion 5.

Figure 5:
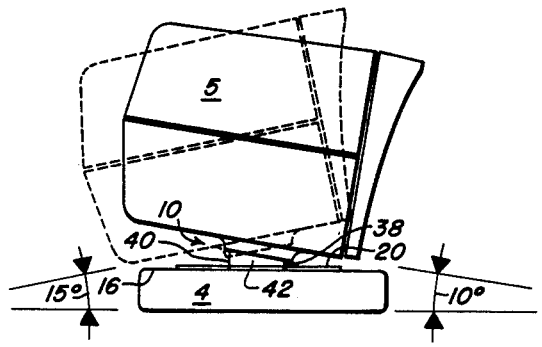
FIG. 5 is a side view of the range of tilt for the CRT of the terminal of FIG. 1.

The display portion 5 is thus tiltable about a horizontal axis 8. The maximum amount of forward or backward tilt is determined by the lower edges 102,104 of the recess 66 meeting the upper surfaces 48,50 of the forward or backward short stepped walls 44,46, respectively. As can be seen in FIG. 5, preferred arrangements of the coupling mechanism 10 permit the display portion 5 to be tilted forward about 10 degrees, and backward, about 15 degrees.

With this configuration, the cylindrical surface 70 is slidable on the cylindrical surface 72 and therefore is rotatable about the horizontal axis 8 (which is perpendicular to the vertical axis 6). Since the adjustment of screws 76 control the friction forces between the display portion 5 and member 21, the adjustments may readily be selected so that the display portion may be adjustably held in any position within its range of motion.

In the preferred form, the elements 16,20,21 and 22 may be made of injected molded KJM material, manufactured by Berg Warner. In either embodiment, different materials may be used.

The invention can be seen from the illustrative embodiment described above to provide a terminal with a secure mounting for the display portion, while still allowing relatively easy manipulation of the display portion to desired positions.

Modifications of the illustrative embodiment may be made by those skilled in the art without departing from the scope of the invention, as defined in the following claims.

We claim:

1. A display terminal including a display portion, a base portion and a coupling mechanism for coupling said display to said base portion, permitting independent movement of the display portion about first and second mutually perpendicular reference axes, comprising:
   A. a cylindrical neck member extending from said base portion along said first axis,
   B. a swivel member including a circular aperture, said swivel member being positioned with said circular aperture disposed about said neck member, said swivel member being pivotable about said first axis, and said swivel member including a first display support member having a convex cylindrical upper surface extending about a first central axis,
   C. a second display support member affixed to said display portion and including a concave cylindrical lower surface extending about a second central axis, said lower surface having substantially the same radius as said upper surface, and
   D. biasing means including a helical spring for biasing said first and second cylindrical surfaces toward each other, whereby said first and second central axes are substantially coaxial with said second reference axis.

2. A display terminal according to claim 1 wherein said biasing means further includes an elongated fastener extending from said lower surface of said second support member through said upper surface of said first display support member, said elongated fastener being substantially coaxial with said helical spring.

3. A display terminal according to claim 2 wherein said first and second display support members include stop members adapted to limit the rotational motion of one of said display support members with respect to the other to a predetermined range.

4. A display terminal according to claim 3 further including a plate located between said helical spring and said first display support member.

5. A display terminal according to claim 1 wherein said neck member includes a pair of transverse slots on opposite sides of said neck member, and said swivel member includes an elongated fastener affixed thereto and extending from said swivel member through said transverse slots, whereby the range of rotational motion of said swivel member with respect to said neck member is limited by the engagement of said fastener with the ends of said transverse slots to a predetermined range.

6. A display terminal including a display portion, a base portion and a mechanism for coupling said display portion to said base portion permitting limited rotational movement about horizontal and vertical reference axes, comprising:

a first vertically extending element affixed to the top of said base portion, a second element mounted on said first element and adapted for rotation about said vertical axis, said first element defining at least one horizontal slot, said second element including a fastening member attached thereto and extending through said horizontal slot, and further including a first cylindrical surface portion extending along a horizontal axis, a third element affixed to said display portion and mounted for rotation about said horizontal axis of rotation, said third element including a second cylindrical surface portion complementary to, and slidable with respect to, said first cylindrical surface portion, mounting means extending from said cylindrical surface portion, said first cylindrical surface portion defining a slot for said mounting means to pass through, spring biasing means mounted on said mounting means and arranged to bias said first cylindrical portion toward said second cylindrical portion.

* * * * *